United States Patent [19]
Peruth et al.

[11] Patent Number: 4,648,016
[45] Date of Patent: Mar. 3, 1987

[54] BLOCKING OSCILLATOR SWITCHED MODE POWER SUPPLY

[75] Inventors: Guenther Peruth; Michael Lenz, both of Munich, Fed. Rep. of Germany

[73] Assignee: Siemens Aktiengesellschaft, Munich, Fed. Rep. of Germany

[21] Appl. No.: 642,000

[22] Filed: Aug. 17, 1984

[30] Foreign Application Priority Data

Aug. 19, 1983 [DE] Fed. Rep. of Germany ....... 3330039

[51] Int. Cl.$^4$ .......................................... H02M 3/335
[52] U.S. Cl. ...................................... 363/21; 363/79; 363/97
[58] Field of Search ....................... 363/19, 20, 21, 79, 363/97, 131

[56] References Cited
U.S. PATENT DOCUMENTS

| | | | |
|---|---|---|---|
| 4,261,032 | 4/1981 | Cavigelli | 363/19 |
| 4,488,210 | 12/1984 | Shono | 363/19 |
| 4,504,898 | 3/1985 | Pilukaitis et al. | 363/21 |

FOREIGN PATENT DOCUMENTS 3032034  3/1982  Fed. Rep. of Germany .

Primary Examiner—Clifford C. Shaw
Attorney, Agent, or Firm—Lawrence C. Edelman

[57] ABSTRACT

The invention relates to a blocking oscillator switched mode power supply which is supplied with a primary voltage $U_p$ obtained by rectification of the AC line voltage. Because the line voltage varies, the secondary voltage which supplies electrical equipment is stabilized by means of a switched mode power supply. The maximum power from the supply generally depends on the primary voltage $U_p$. The present invention has the objective of eliminating this disadvantage of the known switched mode power supplies. To this end, according to the invention, a correction circuit actuated via a voltage divided is provided, the voltage divider being connected to the primary voltage $U_p$. The correction circuit is designed so that it keeps the breakpoint of the secondary current $I_s$ constant. It is thus possible to economize on the normally required overdimensioning of certain parts of the circuit, especially of the transformer, converter, and switching transistor, while on the other hand the invention can be realized at little cost.

5 Claims, 7 Drawing Figures

BLOCKING OSCILLATOR SWITCHED MODE POWER SUPPLY

BACKGROUND OF THE INVENTION

The invention relates to a blocking oscillator switched mode power supply for supplying electrical equipment, wherein the primary winding of a transformer in series with the current-carrying section of an electronic switch is connected to the DC voltage obtained by rectification of the power AC voltage supplied via two supply terminals, and a secondary winding of the transformer is provided to supply current to the electrical equipment, wherein furthermore the control electrode of the three terminal electronic switch is controlled by the output of a control circuit which in turn is actuated by the rectified power AC voltage as actual value and by a set point adjuster, wherein further a starting circuit is provided for the further control of the control electrode of the electronic switch, and wherein lastly the control circuit is constructed so that its current supply is given by means of a secondary winding of the transformer which in turn contains on the one hand a circuit part serving for control voltage generation, with following variable gain amplifier, and on the other hand a circuit part for pulse processing, the output of the variable gain amplifier as well as the output of the pulse processing system being each connected to an input of a pulse duration modulator actuating the control electrode of the electronic switch and forming the output of the control circuit, while a third input of the pulse duration modulator is actuated by a current-voltage converter.

Such a blocking oscillator switched mode power supply is described for example in DE-OS 30 32 034. As additional art may be cited "Funkschau (1975), No. 5, p. 40-43", or the book by Wuestehube et al. titled "Schaltnetzteile" (Switched Mode Power Supplies) (published 1979 in expert-Verlag, VDE-Verlag (cf. in particular p. 87 ff) or Siemens "Schaltnetzteile mit der IS TDA 4600" p. 7 ff.

As is known, such a switched mode power supply supplies electronic apparatus, e.g. a television receiver, with stabilized and regulated operating voltages. The core of such a switched mode power supply, therefore, is a control circuit, the positioning element of which is constituted by the initially mentioned three terminal electronic switch, realized in particular by a bipolar power transistor. Further there is provided a high working frequency and a transformer aligned to a high operating frequency, since it is generally desired to isolate of the electrical equipment to be supplied from the supply network is desired. Such switched mode power supplies may be laid out either according to the synchronized mode or according to the self-heterodyning mode. The latter applies to a switched mode power supply as described in DE-OS 30 32 034 and which the present invention deals with also.

The basic circuit diagram belonging to such a switched mode power supply is illustrated in FIG. 1, which will be discussed initially.

An npn power transistor T serves as a control element and is driven by the control circuit RS and is connected by its emitter-collector path in series with the primary winding $W_p$ of a transformer Tr. The control element could alternatively be another three terminal device, e.g. a thyristor or a power MOS field effect transistor. With reference to FIG. 1 in DE-OS 30 32 034, it can be noted that the DC voltage operating this series connection is obtained by rectification of the AC voltage supplied by the AC network by means of a rectifier circuit, e.g. a Graetz circuit. When an npn transistor is used as the control element, the emitter of this transistor is connected to ground, the collector to the primary winding $W_p$ of this transformer Tr, and the other end of this primary winding to the supply potential $+U_p$ supplied by the rectifier circuit mentioned (but not shown in the drawing). The emitter-collector path of transistor T is bridged by a capacitor Cs, while the capacitance $C_w$ at the primary winding $W_p$ is of a parasitic nature. The power transistor T is controlled at its base by the output part of the initially mentioned control circuit RS, i.e. by the pulse duration modulator PDM provided therein. When using a three terminal device other than a transistor, the control electrode is connected to correspond with the base electrode, the current input lead electrode is connected to correspond with the emitter connection, and the current output electrode is connected to correspond to the collector of the npn transistor T shown in FIG. 1.

An auxiliary winding $W_H$ of the transformer Tr serves as a sensor for the control circuit RS and therefore is connected at one end to ground and at the other end to the input of the control circuit RS. An additional secondary winding $W_s$ forms the actual secondary side of the blocking oscillator transformer Tr, which is provided for the actuation of the rectifier system GL, and the latter for the actuation of a load $R_L$. The DC voltage supplied by the rectifier system GL is hereafter designated by $U_s$.

The control circuit RS contains the output circuit part PDM which controls the transformer T and is designed as a pulse duration modulator, and also contains two input parts controlled by the auxiliary winding $W_H$, one input part RSE serving for control voltage generation and supplying via a control amplifier RV a control signal $U_A$ for the output part PDM. The other input part IAB serves for pulse processing and supplies a signal $U_N$ to the output part PDM of the control circuit RS. Lastly there is provided a current-voltage converter SSW, which forms the actual value control of the control circuit and supplies a voltage $U_{Ip}$ proportional to the primary current $I_p$ to the pulse duration modulator PDM. The last-named parts of the control circuit RS are indicated in the DE-OS 30 32 034 also. They belong to the control circuit illustrated there in FIG. 3. The control voltage generation is effected by the resistors R5 and R4 appearing there in FIGS. 1 and 2. The pulse processor IAB consists, as shown in FIG. 3 of this reference, of a zero crossing identification and the control logic actuated by it. The pulse duration modulator PDM lastly is constituted by the trigger circuit indicated in DE-OS 30 32 034 with the part of the control logic actuated by it.

In FIG. 2 is shown the time diagram belonging to a circuit according to FIG. 1, that is, the time response of the signals occurring in the control circuit RS, namely $U_H$ (=signal supplied by the transformer winding for controlling the control circuit), $U_N$ (=signal supplied by the pulse processor IAB), $I_p$ (=current supplied by the transformer winding $W_p$ in series with the switching transistor T) and $U_{Ip}$ (=the actual-value signal supplied by the current-voltage converter SSW).

As is evident, the voltage $U_H$ supplied by the transformer winding $W_H$ supplies with the zero crossing ($U_H=0$ V) the information that the energy stored in transformer Tr has drained and a new charging cycle can begin, i.e. the switch constituted by transistor T can be closed. This information is communicated to the pulse duration modulator PDM via the pulse processing stage IAB. (There applies in this case: $U_N<0$ V→pulse start, $U_N>0$ V→pulse start not possible.)

Further, with the aid of the control voltage generator RSE, there is obtained from the signal voltage $U_H$ supplied by the winding $W_H$ of transformer Tr a control voltage $U_R$ proportional to the secondary voltage $U_s$. In the variable gain amplifier RV, the control voltage is compared with a reference. The difference between the control voltage $U_R$ and the reference is amplified by the variable gain amplifier and communicated by the signal voltage $U_A$, which is supplied by the output of the variable gain amplifier RV, to the pulse duration modulator PDM, which compares it with the signal $U_{Ip}$ of the current-voltage converter SSW and opens the switch constituted by transistor T'as soon as $U_{Ip} \geq U_A$. In this manner the peak value $I_{pmax}$ of $I_p$ is corrected until the difference between $U_R$ and the reference voltage disappears. This means that $U_R$ and hence $U_s$ remain constant.

As has been mentioned above, FIG. 2 illustrates important signals of the circuit according to FIG. 1. Concerning the theory, reference can be made to the cited book by Wuestehube.

In practice, a switched mode power supply must be short circuit proof with respect to $U_s$. This means that as a certain value $I_{smax}$ for the secondary direct current is exceeded, the secondary voltage $U_s$ collapses. For the operation of the switched mode power supply, therefore, a power limitation is required.

In most cases the output voltage $U_A$ of the variable gain amplifier RV is limited for this purpose or even controlled back (formation of an overload diagram).

Taking first the simple case of power limitation, the maximum secondary power $P_{smax}$ obeys the equation $$P_{smax} = U_s \cdot I_{smax} = (\mu \cdot W_{pmax})/T_{max} \tag{1}$$

where $I_{smax}$ = maximum secondary current
$\mu$ = efficiency
$W_{pmax}$ = the primary energy absorbed and
$T_{max}$ = period duration of the switched mode power supply oscillation when the secondary current Is has the value $I_{smax}$.

Further consideration shows that $I_{smax}$ depends on the primary voltage $U_p$. In fact, if the switched mode power supply is rated for a certain range of the primary voltage $U_p$, the transformer Tr of the oscillator must be dimensioned for power ratings which however, in unfavorable cases, cannot be fully utilized at all. Thus for instance in the voltage range 90 V$\leq U_p \leq$270 V the switched mode supply must be provided with a transformer Tr which must be overdimensioned approximately 100% in order to be able to deliver a certain power in the entire voltage range.

Using equation (1) together with the further equations $$W_{pmax} = (L_p \cdot I_{pmax}^2)/2 \tag{2}$$

($I_{pmax}$ = peak value of current $I_p$ at a pulse width $t_p$, which equals the maximum primary pulse width $t_{pmax}$ for the pulse applied to the control electrode of the setting member T at a voltage $U_A$ at the PDM input controlled by the variable gain amplifier RV which equals its maximum value $U_{Amax}$; $L_p$ = inductance of the primary winding)

$$I_{pmax} = (t_{pmax} \cdot U_p)/L_p, \tag{B 3}$$

$$T_{max} = t_{pmax}/\nu \tag{4}$$

$\nu$ being the duty cycle defined by the equation $$\nu = 1/(1 + U_p/\ddot{U} \cdot U_s) \tag{5}$$

($\ddot{u}$ = transmission ratio of the transformer Tr)
to determine the maximum value for the secondary current $I_s$, one obtains the equation $$I_{smax} = (\mu \cdot t_{pmax} \cdot U_p^2 \cdot \nu)/(2 U_s 19 \, L_p). \tag{6}$$

In the circuit of a blocking oscillator illustrated in FIG. 1, the maximum primary pulse width $t_{pmax}$ is determined by the current-voltage converter SSW.

In view of the circuit to be used, it is also desired that the equation $$I_p \cdot L_p = U_{Ip} \cdot \tau_{ssw}$$

be fulfilled ($\tau_{ssw}$ = time constant of the current-voltage converter SSR in the control circuit). This means that through its time constant $\tau_{ssw}$ the current-voltage converter SSW delivers a voltage $U_{Ip}$ proportional to the primary current $I_p$ if $L_p$ and $\tau_{ssw}$ remain constant.

By means of equation (3) one obtains in general:

$$T_p = (I_p \cdot L_p)/U_p = (U_{Ip} \cdot \tau_{ssw})/U_p$$

and, for the case of the voltage $U_{Ip}$ delivered by the current-voltage converter SSW becoming maximum, because of $$U_{Ipmax} = U_{Amax},$$

$$T_{pmax} = (U_{Amax} \cdot \tau_{ssw})/U_p. \tag{7}$$

With the aid of equation (5) to equation (7) one obtains $$I_{smax} = (U_{Amax} \cdot \tau_{ssw} \cdot \mu)/(2 U_s \cdot L_p \cdot (1/U_p) + (1/\ddot{u}U_2))) \tag{8}$$

It can be seen from equation (8) that the maximum secondary current $I_{smax}$ increases with increasing primary voltage $U_p$, and that, therefore, a direct proportionality exists.

This is the above-mentioned disadvantage, which makes it necessary for high primary voltages $U_p$ to allow for secondary power ratings in the layout of the transformer Tr which in reality are not needed.

The present invention now deals with the problem of achieving a more favorable solution of the problem referred to, so as not to require an overdimensioning of the transformer Tr.

SUMMARY OF THE INVENTION

To this end, a blocking oscillator switched mode power supply is designed on the basis of the present invention in such a way that the end of the primary winding $W_p$ of transformer Tr away from the three terminal electronic switch T is connected via a voltage divider to the ground terminal, and at least one tap point of the voltage divider is connected to the input of a correction circuit which in turn is provided to control the variable gain amplifier RV and/or the actual-value control, i.e. the current-voltage converter SSW in the control circuit RS, and is designed in such a way that, due to the control brought about by it, a given maximum for the power available at the secondary winding $W_s$ of the transformer Tr will be independent of the supply voltage $U_p$.

Thus, by a suitably designed correction circuit, the present invention achieves a stabilization of the $I_s$ breakpoint, whose dependence on the primary voltage $U_p$ is the cause of the mentioned disadvantage. One has the options to act 1. on the value of $U_{Amax}$ or
2. on the value of $\tau_{ssw}$ or
3. on both $U_{Amax}$ and $\tau_{ssw}$ by means of the correction circuit in such a way that the equation $$(U_{Amax} \cdot \tau_{ssw})/(1/U_p)+(1/\ddot{u} \cdot U_s))=K \qquad (9)$$

applies, K being given by the equation $$K=(I_{smax} \cdot 2U_s \cdot L_p)/\mu \qquad (9a)$$

(The $I_s$ breakpoint to be acted upon is also called reversal point, if the voltage $U_A$ delivered by the variable gain amplifier RV to the pulse duration modulator PDM is not only limited but controlled back.)

If the first option is chosen, there applies because of (9)

$$U_{Amax}=(K \cdot ((1/U_p)+(1/(u \cdot U_s))))/\tau_{ssw}. \qquad (10)$$

For the second option:

$$\tau_{ssw}=(K \cdot ((1/U_p)+(1/(u \cdot U_s))))/U_{Amax} \qquad (11)$$

The realization of an arrangement according to the present invention shown in FIG. 3 provides for both cases simultaneously and hence represents the third option. An advantageous realization for application of the second option is shown in FIG. 4, and for the application of the first option, in FIG. 5.

BRIEF DESCRIPTION OF THE DRAWINGS

Exemplary and non-limiting preferred embodiments of the invention are shown in the drawings, in which.

DETAILED DESCRIPTION OF THE PREFERRED EMBODIMENTS

Figure 1:
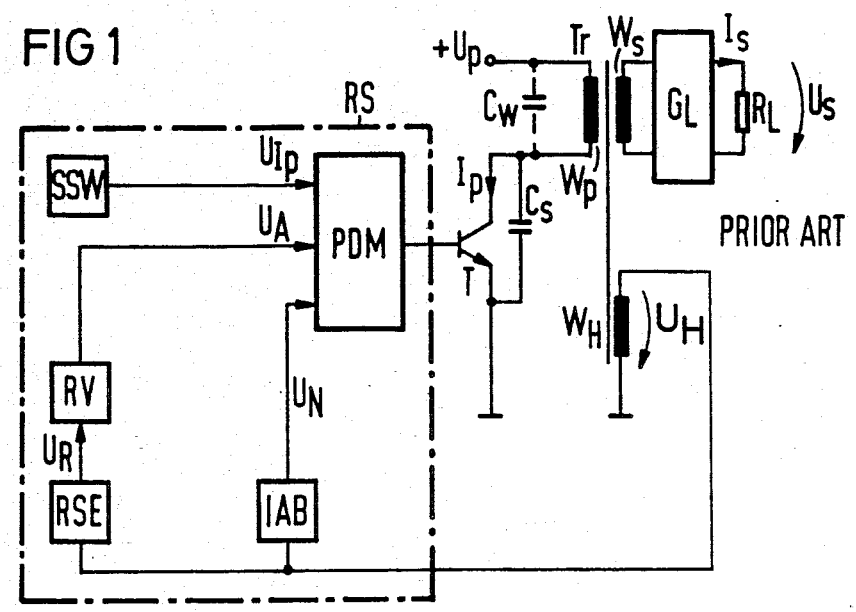
FIG. 1 is a block diagram of a conventional blocking oscillator switched mode power supply.
Figure 2:
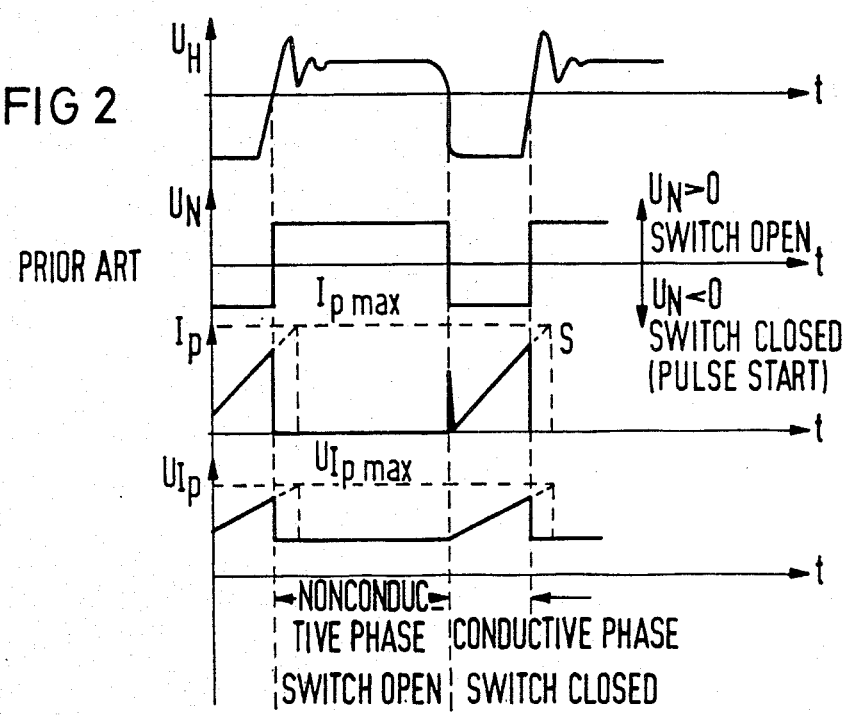
FIG. 2 shows the signals developed in the power supply of FIG. 1.

The same element is indicated by the same reference characters throughout all the Figures.

Figure 3:
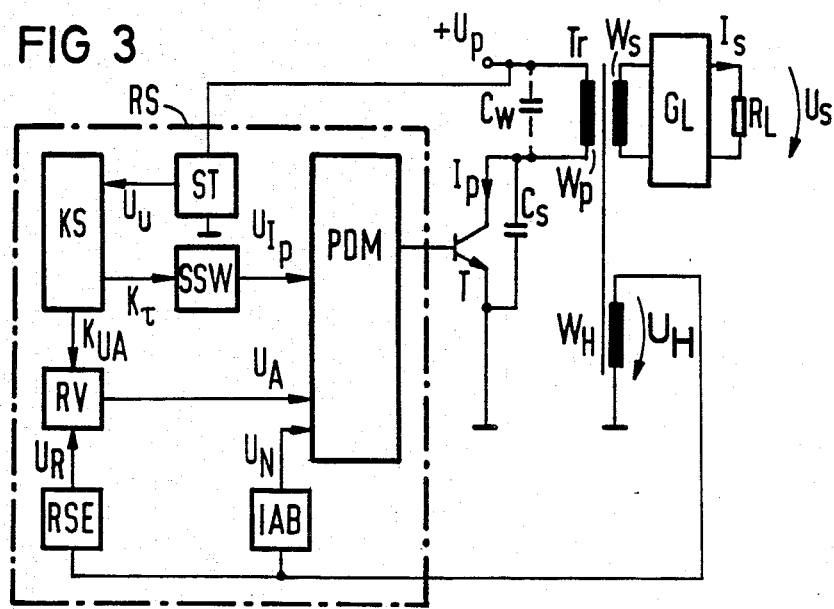
FIG. 3 is a block diagram of a preferred embodiment of the invention.

In the block diagram shown in FIG. 3, which essentially concords with the block diagram according to FIG. 1, we have, therefore, the voltage divider ST, which is actuated at its one end by the potential $+U_p$ (which is connected also to the terminal of the primary winding $W_p$ of transformer Tr away from the switching transistor T) and is connected by the other end to ground. From the tap point of the voltage divider ST a voltage $U_u$ goes to the correction circuit KS, which in turn acts by a signal $K_{UA}$ on the variable gain amplifier RV or respectively by a signal $K_\tau$ on the current-voltage converter SSW. In the case of FIG. 3, the two options 1 and 2 have been taken into consideration.

It is possible to design the correction circuit KS in such a way that it can be used for both options simultaneously. The correction circuit then has advantageously the design evident from FIG. 4, used also—together with the voltage divider ST—in the circuit according to FIG. 5.

Figure 4A:
FIGS. 4, 4a and 4b are schematic diagrams of a portion of FIG. 3.
Figure 4B:
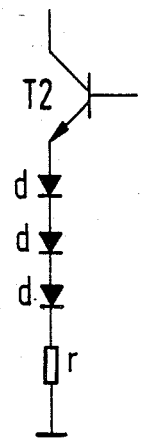
Figure 4:
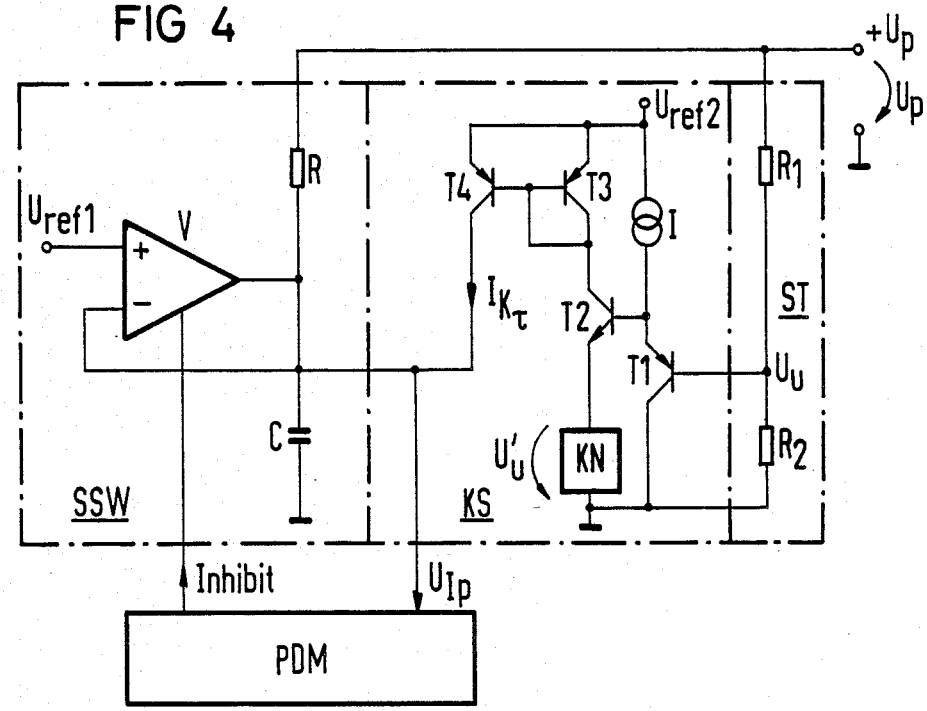

The embodiment shown in FIG. 4 includes a voltage divider ST consisting of two resistors R1 and R2 in series, which is actuated by its end constituted by one terminal R1 at the potential $+U_p$ delivered by the line rectifier (not shown), which potential arises at the end of $W_p$ away from T. By the other end, constituted by one terminal of R2, the voltage divider ST is connected to ground and by its tap point constituted by the two other interconnected terminals of R1 and R2 at the input of the correction circuit KS. The latter is constituted by the base of a pnp transistor T1, the collector of which is connected to ground. The divider voltage which controls the input of the correction circuit KS is marked $U_u$.

The emitter of the input transistor T1 of the control circuit KS is connected on the one hand via a constant current source I represented in the usual manner (e.g. by a transistor) to a reference potential $U_{ref2}$ (defining with ground a reference voltage) and, on the other hand, to the base of an npn transistor T2. Via a correction network KN a connection exists between the emitter of the npn transistor T2 and the terminal for ground, while the collector of T2 controls a current mirror amplifier consisting of the two pnp transistors T3 and T4. The low end of this current mirror amplifier T3, T4 is constituted by the terminal of the control circuit KS which delivers said reference potential $U_{ref2}$, while the input transistor T3 of the current mirror is connected as a diode by its collector and base on the one hand to the collector of the npn transistor T2 and, on the other hand, to the base of the pnp transistor T4, which with its collector forms the output of the current mirror and of the correction circuit KS and delivers the current $I_{K\tau}$.

In the simplest case, the correction network KN may consist of a resistor which connects the emitter of T2 with ground. More favorable, however, is a design as shown in FIG. 4a, 4b, to be discussed more specifically later. The voltage drop occurring at the control network KN is marked $U'_u$.

In the realization of the correction network shown in FIG. 4a, a resistor r is connected on the one hand to ground and, on the other, to the anode of a Zener diode ZD, the cathode of which is connected with the emitter of said npn transistor T2. In the form of the correction network KN shown in FIG. 4b, the Zener diode ZD is replaced by a series connection of three equi-oriented diodes d, the emitter of transistor T2 being connected with the anode of the first of these diodes d and the cathode of the last diode d with the resistor r representing the connection to ground. Instead of the described embodiments for the correction network KN there could also be, e.g., the parallel connection of diodes with resistors or of a Zenor diode with a resistor or the combination of series and parallel connections. By one or more diodes or Zener diodes provided in such a correction network KN a breakpoint characteristic circuit KS is influenced in such a way that the breakpoint of the secondary current $I_s$ becomes independent of the primary voltage $U_p$. In other words, the correction network establishes a nonlinear characteristic of the correction circuit which characteristic obeys equation (10) or respectively equation (11).

Figure 5:
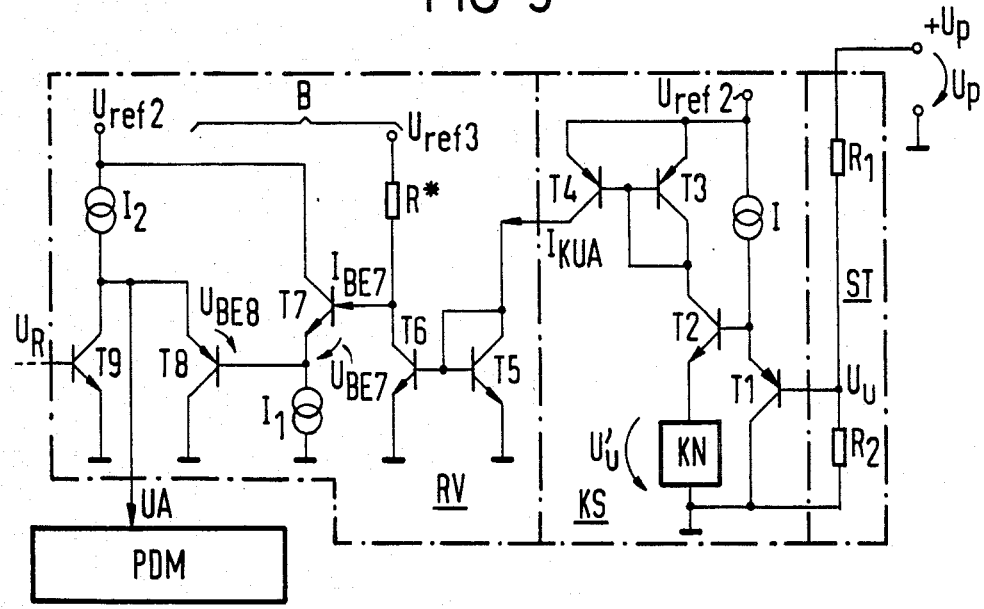
FIG. 5 is an alternate to the circuitry illustrated in FIG. 4.

In the design shown in FIG. 5, utilizing the first option, the correction circuit KS and the voltage divider ST actuating it can likewise be employed to advantage, as has been indicated above.

In the embodiment illustrated in FIG. 4, of a blocking oscillator switched mode power supply according to the present invention, the design of the current-voltage converter SSW is important. The current-voltage converter includes an operational amplifier V, a resistor R, and a capacitor C. The output of the operational amplifier V is connected in feedback to the inverting input, while the non-inverting input is actuated by an additional reference potential $U_{ref1}$. Furthermore the output of the operational amplifier V is connected via the resistor R to the potential $U_p$. Also, said capacitor C forms the connection via the resistor R to the potential $U_p$. Further, said capacitor C forms the connection between the output of the operational amplifier V and the terminal for ground.

According to the invention, the correction of the current-voltage converter SSW through the output of the correction circuit KS (that is, the collector of T4) through the output current $I_{kT}$ thereof occurs in that this output of KS is connected directly with the output of the current-voltage converter. This means that the voltage $U_{Ip}$ delivered by the output of the current-voltage converter SSW (=output of the operational amplifier V), which voltage is provided for the actuation of the pulse duration modulator PDM, is corrected by the current $I_{kT}$ delivered by the output of the correction circuit KS, in the sense of equation (11). Lastly there is provided also a revertive control of the pulse duration modulator PDM to the operational amplifier V by an inhibit signal, so that the operational amplifier V can be turned off during the conductive phase of the power transistor which forms the three terminal electronic switch T.

With the operational amplifier V, connected as voltage follower, the voltage $U_{Ip}$, which is conducted by the current-voltage converter SSW to the pulse duration modulator PDM, is controlled during the blocking phase of the oscillator to $U_{ref1}$ (voltage at the non-inverting input of the operational amplifier V). During the conducting phase, the pulse duration modulator PDM activates the inhibit line of the operational amplifier V and switches the output thereof to the high-resistance third state. With $U_p > > U_{Ipmax}$ ($\Delta U_{Ipmax} = U_{Ipmax} - U_{ref1}$), the voltage $U_{Ip}$ increases $\Delta U_{Ip}/\Delta t \approx U_p/R \cdot C$ ($\Delta U_{Ip}$ = variation of $U_{Ip}$ and $\Delta t$ the respective time interval).

For the primary current $I_p$ we then have $$\Delta I_p/\Delta t = U_p/L_p.$$

By equating one obtains the desired proportionality $$L_p \cdot I_p = \tau_{ssw} \cdot U_{Ip} \text{ with } \tau_{ssw} = (R \cdot C).$$

By feeding into the node between R and C a correction current $I_{kT}$, $\tau_{ssw}$ is acted upon the the desired sense. To this end it is necessary to divide the voltage $U_p$ down to the voltage value $U_u$ by means of the voltage divider ST and to isolate it by means of the transistors T1, T2 of the current source I and to transform it by the correction network KN with an appropriate current-voltage response into a current which is then mirrored at $U_{ref2}$ (e.g. the supply voltage of the control circuit RS) with the aid of the transistors T3 and T4 and then corrects the time constant $\tau_{ssw}$ of the current-voltage converter SSW in the sense of equation (11).

In the realization of a switched mode power supply according to the invention as shown in FIG. 5, the value of $U_{Amax}$ is corrected by the correction circuit KS, the latter operating in the sense of equation (10). Here, as has been mentioned above, the design of the voltage divider ST and of the correction circuit is the same as in FIG. 4. The normal design of the variable gain amplifier RV, however, is enlarged by a limiter circuit B. Of the variable gain amplifier RV only the output transistor T9 is shown, whose emitter is grounded and whose base is controlled by the voltage $U_R$ delivered by the control voltage generator RSE. The collector of transistor T9 is connected in series with a constant current source $I_2$, which in turn is connected to a supply potential $U_{ref2}$. The collector of transistor T9 delivers the voltage $U_A$ on the one hand to the input of the pulse duration modulator PDM provided for the control by the variable gain amplifier RV and, on the other hand, to the emitter of a pnp transistor T8 which acts as a limiter with respect to $U_A$ and whose collector is grounded.

The base of the last named pnp transistor T8 is connected with the emitter of an additional npn transistor T7, whose collector is connected to the end of the constant current source $I_2$ actuated by $U_{ref2}$ and whose emitter is connected not only to said connection with T8 but also to the output of an additional constant current source $I_1$, the low end of which is constituted by ground. The base of the last named npn transistor T7 is controlled by the output of a npn transistor current mirror. The input of this npn current mirror, which is constituted by the npn transistor T5 connected as diode, is formed by the collector and the base of this transistor T5 and is connected directly to the output of the correction circuit KS (i.e. to the output of the pnp current mirror T3, T4), while its low end potential is identical with ground potential of the switched mode power supply. The output of the npn current mirror, constituted by the collector of the npn transistor T6, in the limiter part B of the variable gain amplifier is connected moreover via a resistor R* to an additional reference potential $U_{ref3}$.

The limiter B thus consists of the emitter followers T7 and T8, of the current source $I_1$ and of the current mirror T5, T6. What is limited is the output voltage $U_A$ of the variable gain amplifier RV in order to make the switched mode power supply short circuit proof. The output stage of the variable gain amplifier RV consists of the previously mentioned npn transistor T9 and its load current source $I_2$, which is connected to the potential $U_{ref2}$ serving as supply potential for the control circuit RS.

Now if $I_{kUA}$ is zero, then, since the emitter-base voltage $U_{BE7}$ of T7 is equal to the emitter-base voltage $U_{BE8}$ of T8 and since moreover $I_{B7} \cdot R^*$ is approximately equal to zero, the voltage $U_A$ is clamped to $U_{ref3}$. Due to the correction circuit KS, the supplied current $I_{kUA}$ causes the clamping potential to decrease with increasing $I_{kUA}$. By appropriate designs of the correction network KN as indicated in FIGS. 4a and 4b, equation (10) can thus be readily fulfilled and the behavior of the switched mode power supply aimed at by the invention can be achieved.

To utilize both of the desired correction options, the correction circuit KS is used both for controlling a current-voltage converter according to FIG. 4 and to control a variable gain amplifier RV according to FIG. 5. Such a control offers the advantage that the stabilization of the $I_s$ breakpoint can be influenced by several parameters. Thereby the correction can be made more precise over a broader range of the primary voltage $U_p$.

To summarize, it can be stated that the switched mode power supply as shown e.g. in FIG. 3, equipped with a correction circuit KS according to the invention and with the respective voltage divider ST, has the advantage that the $I_s$ breakpoint and hence the maximum delivered secondary power remains constant. In practice, however, a precise correction of the $I_s$ breakpoint is rarely required, so that one representation of the correction options as well as of the circuit possible for its realization with simple means is sufficient to also ensure the success of the invention.

One example of suitable values is:
$U_{ref1} = 1$ V; $U_{ref2} = 10$ V; $U_{ref3} = 3$ V;
$I = I_1 = I_2 = 100$ μA;
$R = 270$ K ohm; $R1 = 270$ K ohm; $R2 = 12$ K ohm;
$R^* = 5$ K ohm; $r = 47$ K ohm;
$C = 4.7$ nF;
$ZD = a$ 4.7 V Zener diode.

In this form all elements of the current-voltage converter, of the variable gain amplifier and of the correction circuit with the exception of R, C and KN can be combined monolithically. The invention has been realized with very good results with the data just given, among others.

Those skilled in the art will understand that changes can be made in the preferred embodiments here described, and that these embodiments can be used for other purposes. Such changes and uses are within the scope of the invention, which is limited only by the claims which follow.

What is claimed is:

1. In a blocking oscillator switched mode power supply of the type in which
   a primary winding of a transformer is in series with a three terminal electronic switch through first and second terminals thereof and is connected to a DC voltage derived by rectification of an AC line voltage which powers the power supply,
   a first secondary winding of said tranformer supplies current to a load,
   a third terminal of said switch serves as a control electrode and is controlled by an output of a control circuit,
   said control circuit is responsive to said DC voltage and to a setpoint adjuster,
   a starting circuit is provided for further control of said third terminal,
   said control circuit is connected to another secondary winding of the transformer and contains,
      means for generating a control voltage and a variable gain amplifier connected to the output thereof,
      a current-voltage converter,
      a pulse processing system,
      a pulse duration modulator with inputs connected to outputs of the variable gain amplifier, the current-voltage converter and the pulse processing system, the pulse duration modulator being connected to said third terminal and forming an output of said control circuit,
   the improvement comprising:
      a voltage divider formed by two resistors connected in series, and series connection having one end connected to that end of the primary winding which is remote from said switch, another end connected to ground, and a tap; and
      a correction circuit connected to said tap and to the control circuit, and cooperating with the variable-gain amplifier and current-voltage converter in a manner that a maximum power provided at said first secondary winding is independent of said DC voltage, said correction circuit comprising,
         a first PNP transistor having its base connected to said tap, its collector connected to ground, and its emitter connected to a first circuit node;
         a constant current source connected to said first node and a reference voltage of the control circuit; and
         an NPN transistor having its base connected to said first node, its emitter connected to one end of a correction network, and its collector connected to a PNP current-mirror amplifier, said correction network being connected between said emitter and ground and said current-mirror amplifier being connected at its low end to said reference voltage and forming an output of the correction circuit at its output.

2. The improved blocking oscillator switched mode power supply of claim 1, wherein the current-voltage converter comprises:
   an operational amplifier having its non-inverting input connected to another reference voltage and its output and inverting input connected to a second circuit node;
   a capacitor connected between said second node and ground; and
   a resistor connected between said second node and said end of the primary winding to which one end of the voltage divider is connected, said node forming an output of the current-voltage converter and being connected to an input of said pulse duration modulator.

3. The improved blocking oscillator switched mode power supply of claim 1, wherein the variable-gain amplifier comprises:
   a limiter circuit having an output connected to a third reference voltage through a resistor, the output voltage of the variable-gain amplifier being clamped at said third reference voltage, the limiter circuit including an NPN current-mirror amplifier with an input connected to the output of the correction circuit, a grounded low end, and an output, an NPN transistor having its base connected to the output of the NPN current-mirror amplifier, its emitter connected to ground through a constant-current source, and its collector connected to said reference voltage;
   a PNP transistor with its emitter connected to said reference voltage through another constant circuit source, with its base connected to the emitter of the NPN transistor in the limiter circuit, and with its collector grounded; and an output NPN transistor with its base being connected as an input for the variable gain amplifier, its emitter being grounded, and its collector being connected to the emitter of the PNP transistor and forming an output which is connected to the pulse duration modulator.

4. The improved blocking oscillator switched mode power supply of claim 1, wherein said connection network comprises at least one diode and a resistor connected thereto.

5. The improved blocking oscillator switched mode power supply of claim 4, wherein said diode is a Zener diode.

* * * * *